United States Patent [19]
Basile

[11] Patent Number: 4,549,756
[45] Date of Patent: Oct. 29, 1985

[54] CONDUIT COUPLING ASSEMBLY

[75] Inventor: Raffaele Basile, Chicago Heights, Ill.

[73] Assignee: Allied Tube & Conduit Corporation, Harvey, Ill.

[21] Appl. No.: 499,192

[22] Filed: May 31, 1983

[51] Int. Cl.[4] .............................................. F16L 25/00
[52] U.S. Cl. ...................................... 285/388; 285/31;
 285/354; 285/392
[58] Field of Search .................... 285/390, 392, 31, 32,
 285/388, 386, 354

[56] References Cited

U.S. PATENT DOCUMENTS

| | | | |
|---|---|---|---|
| 1,119,752 | 12/1914 | Goethner et al. | 285/388 X |
| 1,270,021 | 6/1918 | Delehanty. | |
| 2,857,176 | 10/1958 | McTaggart et al. | |
| 3,218,096 | 11/1965 | Press. | |
| 3,984,130 | 10/1976 | Berger et al. | 285/388 X |
| 4,082,319 | 4/1978 | Berger et al. | 285/388 X |
| 4,258,936 | 3/1981 | Goldberg | 285/388 X |

FOREIGN PATENT DOCUMENTS 10085 of 1896 United Kingdom.

*Primary Examiner*—Richard J. Scanlan, Jr.
*Attorney, Agent, or Firm*—Fitch, Even, Tabin & Flannery

[57] ABSTRACT

A conduit coupling assembly for connecting the end portions of a pair of lengths of tubular conduit in coaxial, abutting relationship. Each end portion has external threads of the same size. The coupling assembly includes an abutment ring, locking means, and an outer coupling. The abutment ring has an internal thread sized for threading onto the end portion of one of the lengths of conduit, while the locking means prevents unthreading of the abutment ring once it is installed. The outer coupling has a first end and a second end with a bore extending therebetween sized to slidably, rotatably receive the abutment ring. The inside dimensions of the coupling ends are smaller than an outside dimension of the ring so that the ring is unable to move past the coupling ends. The coupling first end is provided with an internal thread sized for threading on the conduit end portions whereby, with the coupling first end threaded onto the end portion of the one length of conduit and facing the other length of conduit, the other length of conduit can be brought into axial alignment with the one length of conduit and the coupling first end can be threaded onto the end portion of the other length to couple the lengths of conduit.

8 Claims, 4 Drawing Figures

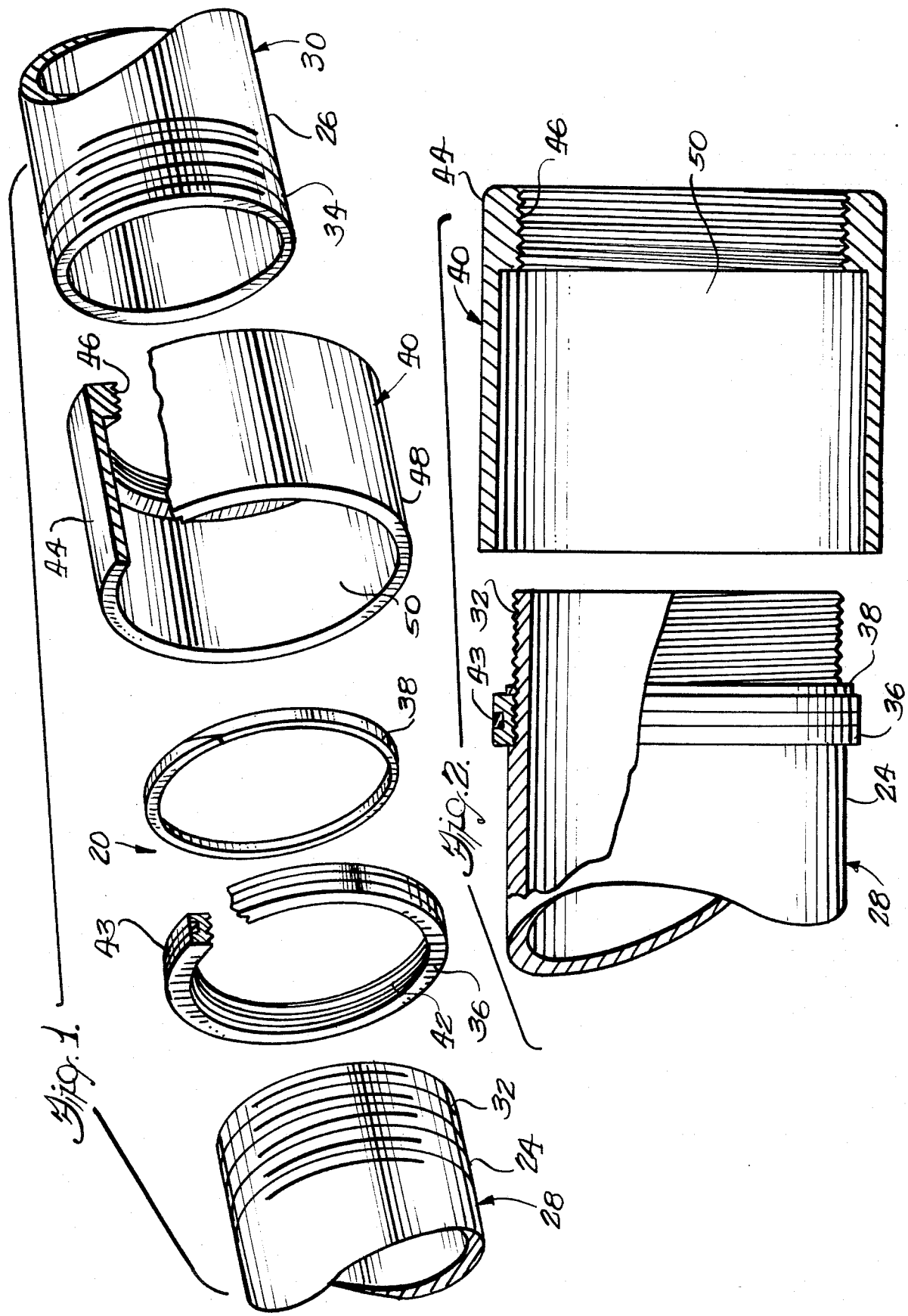

CONDUIT COUPLING ASSEMBLY

BACKGROUND OF THE INVENTION

The present invention relates to couplings for conduits and pipes and, more specifically, to a coupling assembly for joining the threaded ends of a pair of lengths of conduit in coaxial, abutting relationship.

It is a conventional practice in many types of pipe or conduit systems, and particularly in electrical systems employing tubular conduits, to connect a number of lengths of conduit in end-to-end relation through means of couplings so as to form a continuous conduit system as necessary for a particular application. In the case of thin wall conduit, which is primarily employed for encasing electrical cable or conductor wires in applications where the conduit will not be subjected to large stresses, compression fittings or couplings may be employed which are swaged or otherwise affixed to adjacent ends of conduit lengths. The conduit is generally available in different lengths, commonly 10 and 20 foot lengths, and may be quite readily formed to various bend contours and coupled end-to-end through the compression couplings.

Another type of conduit which is particularly useful in commercial and industrial applications is generally termed rigid pipe or conduit. Such conduit may, for example, range up to 2½ inches or greater in outer diameter and may have a wall thickness of 0.100 inch or greater which facilitates forming of external threads on the opposite ends of each length of conduit to enable their connection in end-to-end relation. As with thin wall conduits, the rigid pipe or conduit is also conventionally made in lengths of up to 10 to 20 feet long. Due to their relative weight, the rigid pipe lengths are not as readily manipulated during installation and are frequently installed where access is relatively limited so that rotation of the individual lengths, may be quite difficult, if not impossible.

One known technique for connecting lengths of rigid pipe or conduit in end-to-end relation is to provide generally V-shaped external pipe threads of standard size on the opposite ends of each length or section of conduit and then connect the desired number of conduit lengths in end-to-end relation through couplings having internal pipe threads therein which enable threaded connection with adjacent ends of conduit to form a structurally sound connection or coupling. A major drawback in this technique is that the coupling must be threaded onto one conduit section or length followed by relative movement between this conduit section and the conduit section to which it is to be coupled so that the conduit sections are in axial alignment. This generally requires relative longitudinal movement between adjacent conduit sections with simultaneous relative rotation therebetween to effect threaded engagement between the second conduit section and the coupling. Should the need subsequently arise to replace an intermediate section or length of conduit, either a length of the conduit or one or more couplings, or both the conduit and the couplings, must be destroyed in order to effect disassembly.

One recently proposed conduit coupling assembly permits lengths of conduit to be joined quickly. Furthermore, if replacement of a component of a completed system should be required, the coupling assembly allows disassembly of the system without adjacent lengths of conduit undergoing substantial relative longitudinal movement and without any need to rotate one of the lengths of conduit. This coupling assembly includes an outer coupling having ends and a bore extending therebetween for slidably, rotatably retaining an inner abutment ring having an inner thread so that the ring can be threaded onto the end portion of one of the lengths of conduit. This threading is accomplished by using the outer coupling as, in effect, a wrench. The abutment ring has a special annular lip having a slot for receiving the inward extension of a set screw received in a threaded aperture through the outer coupling. After installation of the abutment ring, the set screw is removed or adjusted so as not to interfere with sliding of the outer coupling relative to the abutment ring. It will be appreciated that this coupling system requires specially manufactured components and requires threading and unthreading of the set screw. For a more complete description of this coupling assembly and its operation, reference may be made to commonly assigned U.S. Pat. No. 4,258,936 to Goldberg.

SUMMARY OF THE INVENTION

Among the several objects of the present invention may be noted the provision of an improved coupling assembly; the provision of such coupling assembly which allows lengths of conduit to be quickly joined without their relative rotation; the provision of such coupling assembly which permits convenient partial disassembly of a conduit system without substantial relative longitudinal of adjacent lengths of conduit; the provision of such coupling assembly which uses easily manufactured components; the provision of such coupling assembly which avoids using an outer coupling to install an abutment ring and which permits installation of the the abutment ring prior to its association with the outer coupling; the provision of such coupling assembly which avoids the installer being required to keep track of any loose parts and which allows connection of conduit lengths by merely rotating the outer coupling; and the provision of such coupling assembly which has long service life and is reliable in use. Other objects and features of the present invention will be in part apparent and in part pointed out hereinafter in the specification and attendant claims.

Briefly, the conduit coupling assembly of the present invention includes an abutment ring, locking means, and an outer coupling. The abutment ring has an internal thread sized for threading onto the end portion of one of the lengths of conduit. The locking means prevents unthreading of the abutment ring once it is installed. The outer coupling has a first end and a second end with a bore extending therebetween sized to slidably, rotatably receive the abutment ring. The coupling ends have inside dimensions smaller than an outside dimension of the abutment ring so that it is unable to move past the couplings ends. The coupling first end has an internal thread sized for threading onto the conduit end portions, so that with the coupling first end threaded onto the end portion of one length of conduit and facing the other length of conduit, the other length of conduit can be brought into axial alignment with the one length of conduit and the coupling first end can be threaded onto the end portion of the other length of conduit to couple the lengths of conduit.

BRIEF DESCRIPTION OF THE DRAWINGS

FIG. 1 is an exploded perspective of the coupling assembly of the present invention, with certain components removed, for joining the threaded ends of two lengths of conduit;

FIG. 2 is a sectional view showing an abutment ring and an outer coupling of the coupling assembly with the abutment ring installed on one length of conduit and the outer coupling in position to be moved over the ring;

Corresponding reference characters indicate corresponding parts thoughout the several views of the drawings.

DESCRIPTION OF THE PREFERRED EMBODIMENT

Figure 3:
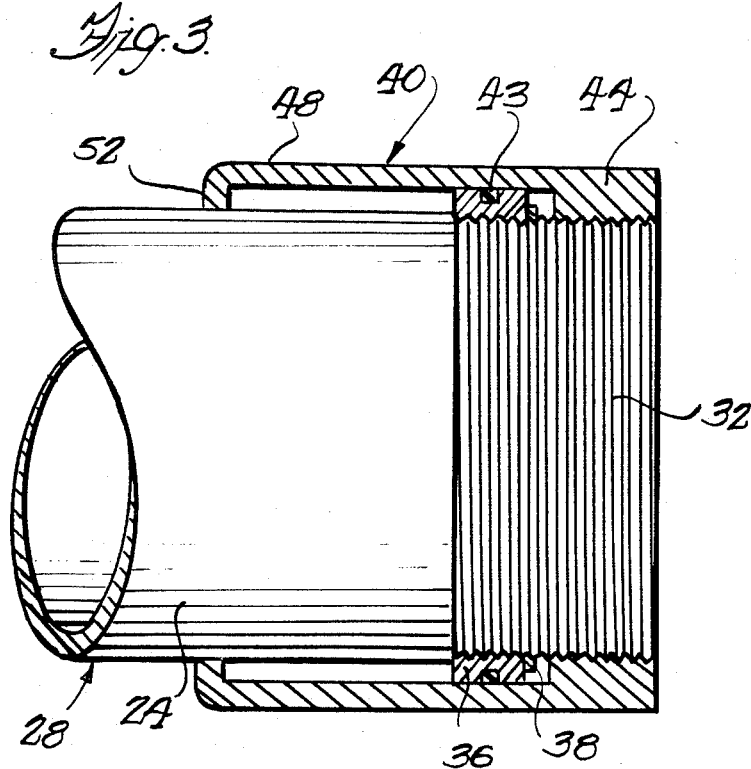
FIG. 3, similar to FIG. 2, illustrates the outer coupling installed on the one length of conduit.

Referring now to the drawings, a coupling assembly of the present invention for connecting the end portions 24, 26 of a pair of lengths of conduit 28, 30, respectively, is designated generally by reference character 20. Each end portion has an external thread 32, 34 of the same size. Coupling assembly 20 comprises an abutment ring 36 for positioning on the end portion of one of the lengths of conduit, locking means in the form of a locking ring 38 for preventing removal of the abutment ring, and an outer coupling 40 for engaging the abutment ring and for threading onto the other length of conduit thereby joining lengths of conduit 28, 30.

More specifically, abutment ring 36 has an internal thread 42 sized for threading onto end portion 24 of conduit length 28. As an option, ring 36 could have a peripheral groove 43 for seating an O-ring. Locking ring 38 is a split or snap ring as is well known to those skilled in the art and is used to back up locking ring 38, as shown in FIG. 2, to prevent its unscrewing from end portion 24. Outer coupling 40, preferably formed of mild steel, includes a first end 44 having an internal thread 46 sized for mating with the external threads on conduit end portions 24, 26. Extending from first end 44 is a cylinder 48 having a bore 50 for slidably, rotatably receiving abutment ring 36.

Referring to FIG. 3, the distal end of the cylinder is turned inwardly to form a second end 52 of outer coupling 40. Second end 52, like first coupling end 44, has an inside dimension smaller than the outside diameter of the abutment ring 36. More specifically, second end 52 defines an aperture, circular in cross section, having a diameter slightly greater than the outside diameter of end portions 24, 26 but less than the outside diameter of abutment ring 36. Thus once outer coupling 40 is positioned over abutment ring 36 and second end 52 turned inwardly, the outer coupling is slidable and rotatable with respect to ring 36; but it cannot be removed from conduit end portion 24. The installation on conduit end portion 24 of abutment ring 36, locking ring 38, and outer coupling 40; as well as the inward turning of second end 52, is preferably performed at the conduit manufacturing facility. Thus the worker at the construction site need not be required to keep track of any loose parts and needs only a pipe wrench, or the like, to effect joinder of conduit lengths 28, 30.

As shown in FIG. 3, the longitudinal extent of thread 32 on end portion 24 of length of conduit 28 is preferably at least substantially equal to the cumulative longitudinal extent of abutment ring 36, locking ring 38, and outer coupling first end 44. This allows outer coupling 40 to be screwed onto end portion 24 so that coupling 40 and the end of length of conduit 28 are substantially flush, which permits the two lengths of conduit to be brought into axial alignment when their ends are disposed closely adjacent. This further allows removal of a length of conduit from a completed system without relative longitudinal movement of adjacent lengths of conduit.

Figure 4:
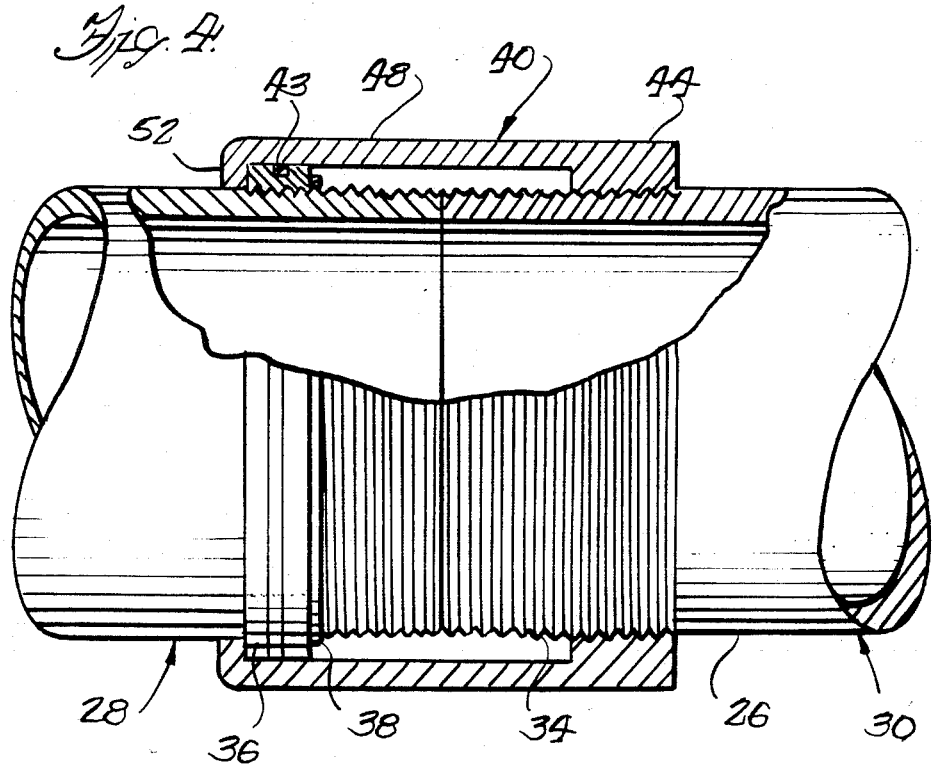
FIG. 4, also similar to FIG. 2, depicts the coupling assembly connecting the two lengths of conduit in coaxial, abutting relationship.

Referring to FIG. 4, the longitudinal extent of thread 34 on end portion 26 of length of conduit 30 is at least as great as the distance outer coupling 40 extends from the end of conduit length 28 when coupling second end 52 engages abutment ring 36. Thus continued threading of coupling 40 brings the ends of conduit lengths 28, 30 into engagement. It will be appreciated that in a conduit system where all conduit lengths abut, the pulling of electrical cables therethrough is greatly facilitated because of the substantially constant cross section of the bore throughout the system.

Operation of the coupling assembly of the present invention is as follows: At the conduit manufacturing facility, the abutment ring 36 is threaded onto conduit end portion 24 and locking ring 38 applied by using a screwdriver or the like to spread the ring. Ring 32 is moved over thread 32 until it engages abutment ring 36. Release of the locking ring causes it, due to its resiliency, to enter the thread to prevent movement of the abutment ring. After cylinder 48 is positioned to extend over the abutment ring, second end 52 is inwardly deformed, by machinery well known to those of skill in the art, to retain the coupling. First end 44 is screwed onto thread 32 until it is flush with the end of conduit length 28, FIG. 3.

It will be appreciated that the typical installation of a conduit system is overhead. Therefore, it is particularly desirable to reduce the amount of time the assembler, who may be in a precarious position standing on a ladder, is required to lift one length of conduit into axial alignment with the other to join them. With the coupling of the present invention, after aligning the two lengths of conduit, it is only required to thread outer coupling 40 onto end portion 26 of conduit length 30. Continued tightening causes second end 52 to engage abutment ring 36. Still further tightening of outer coupling 40 causes relative longitudinal movement between the two lengths of conduit until their facing ends are brought into abutting relationship, FIG. 4. If removal of a length of conduit is later required, this can be accomplished without destruction of one of more components of the system because no relative longitudinal movement of adjacent lengths of conduit is required. The outer couplings at the ends of the length of conduit to be removed are merely unthreaded until they are flush with the conduit end portions carrying them, and the conduit length moved laterally of its axial direction until it becomes disassociated with adjacent conduit lengths.

As a method of coupling the pair of lengths of conduit using coupling assembly 20, the present invention includes several steps:

(a) Abutment ring 36 is threaded onto end portion 24 of length of conduit 28.

(b) Locking ring 38 is applied to end portion 24 to back up abutment ring 36 thereby to preclude the abutment ring from unthreading.

(c) The cylinder 48 of outer coupling 40 is slid over end portion 24 until the distal end of the cylinder extends past the abutment ring.

(d) The distal end is deformed to define a coupling second end 52 which has an inside dimension smaller than an outside dimension of the abutment ring to prevent retrograde movement of second end 52 past the abutment ring.

(e) First end 44 of the outer coupling is threaded onto end portion 24 until the outer coupling and the end portion terminate substantially flush.

(f) Threaded end portion 26 of length of conduit 30 is moved into axial alignment with length of conduit 28.

(g) And the first end of the outer coupling is threaded onto end portion 26 thereby coupling the lengths of conduit. Steps a-e are preferably performed at the conduit manufacturing facility and constitute a method of applying the coupling assembly 20 to end portion 24 of length of conduit 28, while steps f and g are performed at the construction site.

In view of the above, it will be seen that the several objects of the inventon are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A conduit coupling assembly for connecting the end portions of a pair of lengths of tubular conduit or the like in coaxial, abutting relationship, said end portions each having external threads of the same size, said coupling assembly comprising:

an abutment ring having an internal thread sized for threading onto the end portion of one of said lengths of conduit;

locking means preventing unthreading of said abutment ring once it is threaded; and an outer coupling having a first end and a second end and a bore extending therebetween sized to slidably, rotatably receive said abutment ring, said coupling ends having inside dimensions smaller than an outside dimension of said ring so that said ring is unable to move past said coupling ends, said coupling first end having an internal thread sized for threading onto said conduit end portions whereby, with said coupling first end threaded onto the end portion of said one length of conduit and facing the other length of conduit, said other length of conduit can be brought into axial alignment with said one length and said coupling first end can be threaded onto the end portion of said other length to couple the lengths of conduit, said locking means comprising a locking ring disposed in the thread of the end portion of said one length of conduit and backing up said abutment ring.

2. An assembly as set forth in claim 1 wherein the longitudinal extent of the thread on the end portion of the other length of conduit is at least as great as the distance said coupling extends from said one length of conduit when said second coupling end abuts said ring whereby continued threading of said coupling onto said other length of conduit will cause the conduit ends to be brought into engagement.

3. An assembly as set forth in claim 1 wherein the longitudinal extent of the thread on the end portion of the one length of conduit is at least substantially equal to the cumulative longitudinal extent of said abutment ring, said locking means and said coupling first end whereby said coupling can be positioned substantially flush with the end of said one length of conduit to facilitate axial alignment of said one length of conduit with the other length of conduit when they are disposed closely adjacent.

4. An assembly as set forth in claim 1 wherein said coupling second end defines an aperture, circular in cross section, having a diameter greater than the outside diameter of the ends of said lengths of conduit.

5. An assembly as set forth in claim 1 wherein said outer coupling is made of soft, deformable metal.

6. A method of applying a coupling assembly, for coupling a pair of lengths of conduit each of which has an end portion with an external thread of the same size, to the end portion of one of said lengths of conduit, said coupling assembly including an abutment ring having an internal thread sized for threading onto the end portion of said one of the lengths of conduit, said coupling assembly further comprising an outer coupling having a first end having an internal thread sized for threading onto the threads of said lengths of conduit and said coupling including a cylinder extending from said first end and sized to slidably, rotatably receive said abutment ring, said method comprising the following steps:

(a) threading said abutment ring onto the end portion of said one length of conduit;

(b) sliding said cylinder of said outer coupling over the end portion of said one length of conduit until the distal end of said cylinder extends past said abutment ring; and (c) deforming said distal end until it has an inside dimension smaller than an outside dimension of said ring to prevent retrograde movement of said deformed distal end past said ring.

7. A method as set forth in claim 6 comprising the following further step to be performed after step (a):

applying locking means to preclude said ring from unthreading.

8. A method as set forth in claim 6 comprising the further step to be performed after step (c):

threading said first end onto the threaded end portion of said one length of conduit until said outer coupling and said end portion terminate substantially flush.

* * * * *